W. C. LEE.
BOLL WEEVIL TRAP.
APPLICATION FILED APR. 5, 1910.
997,141.
Patented July 4, 1911.
2 SHEETS—SHEET 1.
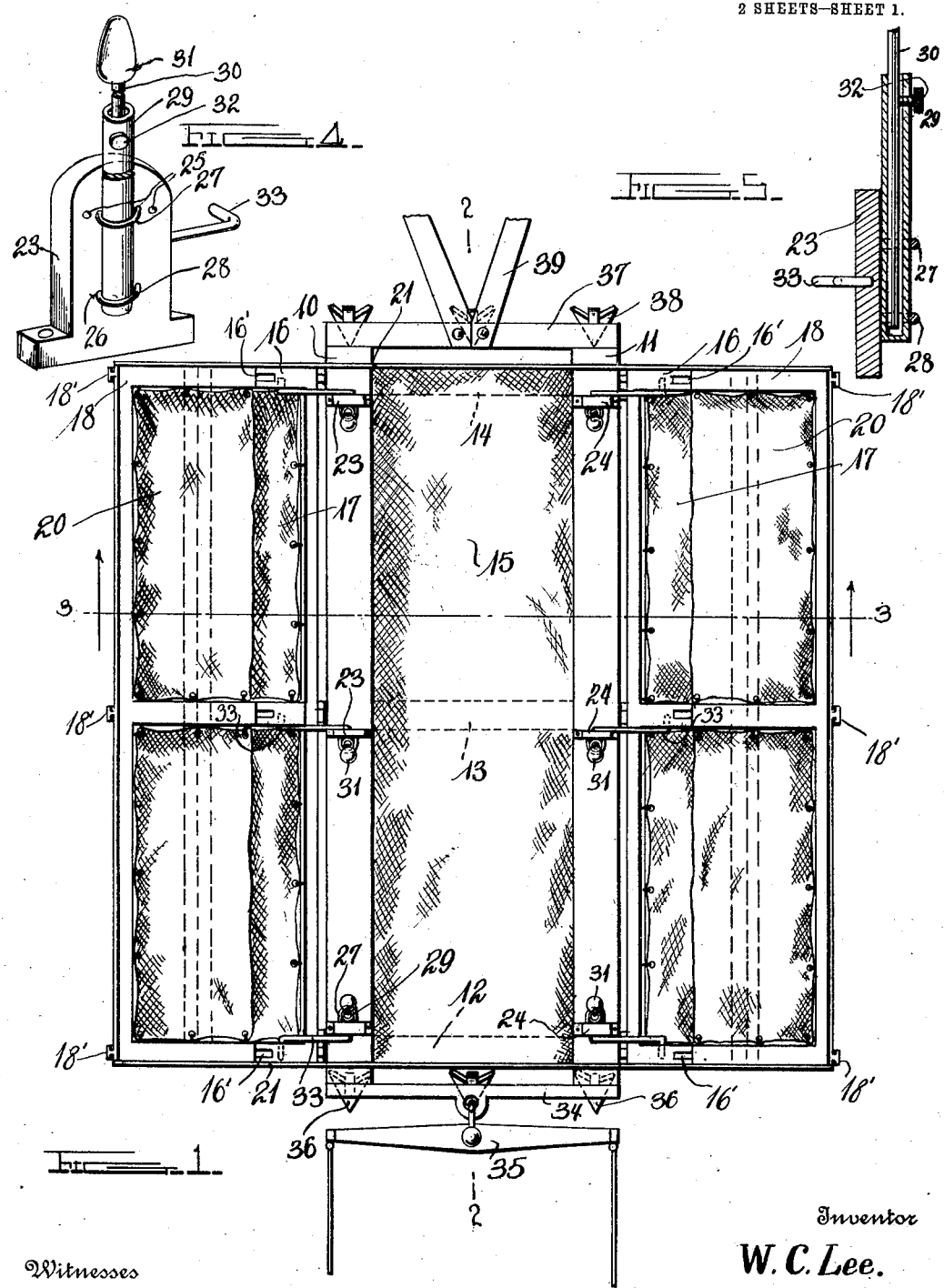
Witnesses
Ernest Crocker
Henry T. Bright
Inventor
W. C. Lee.
By
Chandler & Chandler
Attorneys W. C. LEE.
BOLL WEEVIL TRAP.
APPLICATION FILED APR. 5, 1910.
997,141.
Patented July 4, 1911.
2 SHEETS—SHEET 2.
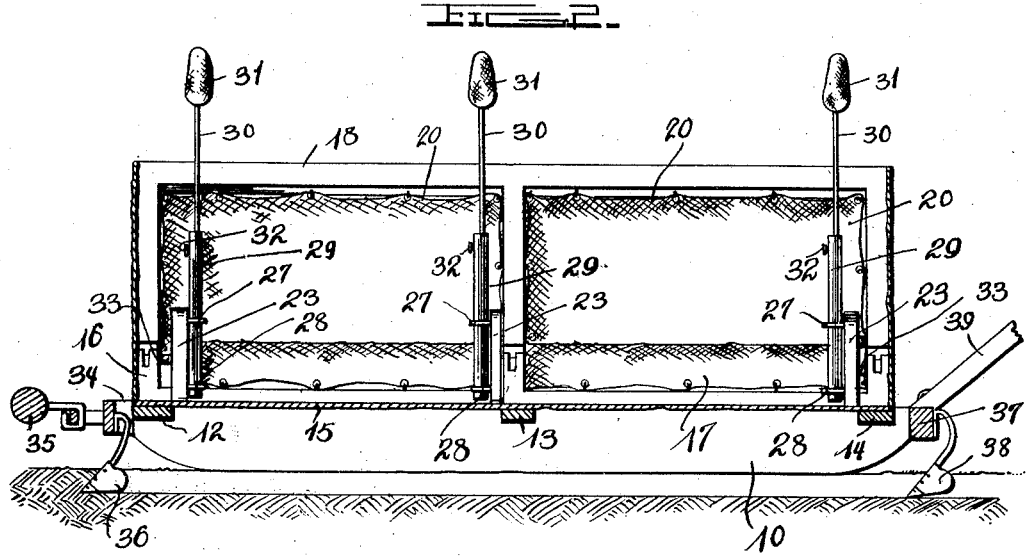
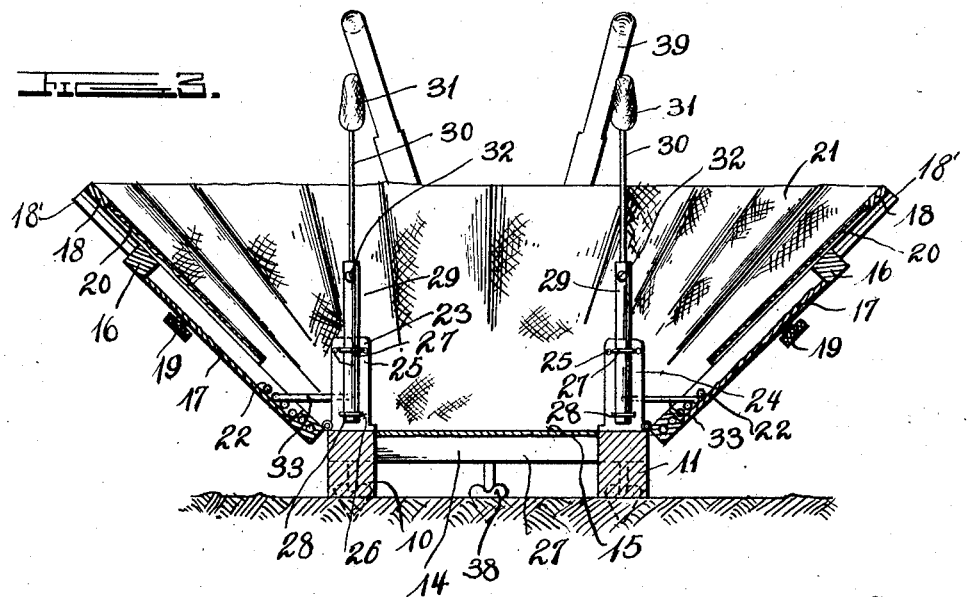
Witnesses
Ernest Crocker
Henry P. Bright
Inventor
W C. Lee.
By Chandler & Chandler
Attorneys

UNITED STATES PATENT OFFICE.

WILLIAM C. LEE, OF PLAQUEMINE, LOUISIANA.

BOLL-WEEVIL TRAP.

997,141. Specification of Letters Patent. Patented July 4, 1911.

Application filed April 5, 1910. Serial No. 553,592.

*To all whom it may concern:*

Be it known that I, WILLIAM C. LEE, a citizen of the United States, residing at Plaquemine, in the parish of Iberville, State of Louisiana, have invented certain new and useful Improvements in Boll-Weevil Traps; and I do hereby declare the following to be a full, clear, and exact description of the invention, such as will enable others skilled in the art to which it appertains to make and use the same.

This invention relates to boll weevil traps and is particularly adapted for removing and collecting the diseased forms or squares of the cotton plant which contain the boll weevil and its eggs, so that same may be disposed of by burning or otherwise.

The object of the invention resides in the production of a device which comprises a sledlike base provided with a body portion having angularly adjustable side members and collapsible end members; the whole being adapted to be moved between rows of cotton plants in order that said plants may be agitated by a plurality of beaters carried by the device and the diseased portion of the cotton plant removed by such agitation and gathered in bulk upon the contrivance to be subsequently destroyed by burning or any suitable method.

With these and other objects in view the invention consists in the details of construction and in the combination and arrangement of parts to be hereinafter more fully described and set forth in the claims.

In describing the invention in detail reference will be had to the accompanying drawings in which like characters of reference denote corresponding parts in the several views; and in which, Figure 1 is a top plan view of the invention; Fig. 2, a section on the line 2—2 of Fig. 1; Fig. 3, a section on the line 3—3 of Fig. 1; Fig. 4, a detail view of one of the beaters and its support carried by the device; and Fig. 5, a vertical longitudinal section of what is shown in Fig. 4.

Referring to the drawings, the device is shown as comprising a pair of runners 10 and 11 which are held together in parallel spaced relation by cross braces 12, 13 and 14 and a suitable flooring 15 is disposed between said runners and supported intermediately upon the cross braces 12, 13 and 14. Hingedly connected to the runners 10 and 11 in longitudinal disposition with respect thereto are corresponding frames 16 having a suitable covering of fabric 17 and their transverse members provided with slots 16'. Carried by each of the frames 16 is another sliding frame 18, the transverse members of which are provided with ribs 18' which extend through and slide in the slots 16' of the transverse members of the frames 16 to permit the adjustment of said frame 18 crosswise of the frame 16, by which it is carried, whereby the width of the side members carried by the runners may be varied to conform with variations in the distance between the rows of cotton plants; said adjustment of the frames 18 with respect to the frames 16 being maintained by suitable set screws 19 which pass through the transverse ribs of the frames 16. Each of the frames 18 are also covered with a suitable fabric 20. The ends of the body portion of the device are closed by suitable sheets of canvas 21 which are attached to the corresponding ends of the adjustable side members; the folds of said canvas permitting the angular adjustment of said side members and at the same time maintain the ends of the body of the device closed. Each of the transverse ribs of the frames 16 are provided at their lower ends with a series of alined apertures 22 for a purpose to be presently described.

Upon the runner 10 are a plurality of vertically disposed plates 23, while corresponding plates 24 are mounted upon the runner 11. Each of the plates 23 and 24 have provided therein near their top, a plurality of apertures 25, while similar apertures 26 are disposed at their bases. The apertures 25 and 26 are adapted to receive the terminations of U-shaped clips 27 and 28 which serve to support in vertical position a tubular member 29. The apertures 25 at the top of each of the plates 23 and 24 are of sufficient number to permit the lateral shifting of the clip 27 whereby the tubular member 29 is capable of a limited angular adjustment. Mounted for vertical adjustment in each of the tubular members 29 is a rod 30 which carries on its upper end a cushion 31 adapted to contact with the foliage of the cotton plant as the device is moved, to effect an agitation or beating of said plant, and a consequent removal of the diseased portions thereof, which will be directed into the body of the device upon their descent as will be obvious. The adjustment of the rod 30 is maintained through the medium of suitable set screws 32 mounted in the tubular members 29 and adapted to bind upon said rod when screwed home. Each of the plates 23 and 24 carry a hook member 33, the end of which is adapted for engagement in the apertures 22 of the adjacent transverse ribs of the frames 16. By this engagement it will be obvious that the angular adjustment of the frames 16 may be had by transferring the engagement of the hook 33 from one aperture in the transverse rib of the frame to another aperture; the number of adjustments that may be had being determined by the number of apertures in the transverse ribs of the frame.

The forward end of the runners 10 and 11 are connected together by a stirrup 34 to which is attached a swingletree 35 for the purpose of holding a suitable draft animal, while a plurality of cultivator blades 36 depend from said stirrup and serve to loosen the soil as the device is drawn along the ground. Another stirrup 37 connects the rear end of the runners 10 and 11 and carries a plurality of cultivator blades 38 and a pair of guide handles 39.

From the foregoing description it is believed the operation of the device will be apparent; it being only necessary to dispose same between two rows of cotton plants and effect an angular adjustment of the side members of the body and also an adjustment of the frames 18 on the frames 16 so that the outer longitudinal edge of the frames 18 will be disposed inward of the stems of the cotton plants but beneath the foliage thereof. A movement of the device along the ground will thus cause the beaters 31 to gently engage the foliage of the plants and shake the diseased portions therefrom into the body of the device, when same can be carried to a distant point and suitably destroyed.

What is claimed is:—

1. A device of the character described comprising a base, side and end members surrounding the base, each of said side members comprising a pair of frames, one of which is pivoted to the base, and the other slidably mounted upon the first named frame for adjustment transversely of the latter, means for holding said pivoted frame in different adjustments with respect to the base, and a plurality of beaters mounted on said base.

2. A device of the character described comprising a base, side and end members surrounding the base, each of said side members comprising a pair of frames, one of which is pivoted to the base and provided with slots in its transverse members, and the other frame having ribs disposed in the slots of the first named frame respectively, whereby said last named frame is slidably mounted upon the first named frame for movement transversely of the latter, means for holding said pivoted frame in different adjustments with respect to the base, and a plurality of beaters mounted on said base.

3. A device of the character described comprising a base, side and end members surrounding said base, a plurality of vertically disposed plates mounted on said base, a tubular member secured to each plate, means for adjusting said member with respect to its supporting plate so as to be disposed at various angles to said base, and an adjustable stem mounted in each of said tubular members.

In testimony whereof, I affix my signature, in presence of two witnesses.

WILLIAM C. LEE.

Witnesses:
   GEO. A. DELACROIX,
   JOSEPH A. GRACE.

---

Copies of this patent may be obtained for five cents each, by addressing the "Commissioner of Patents, Washington, D. C."